Figure 3:
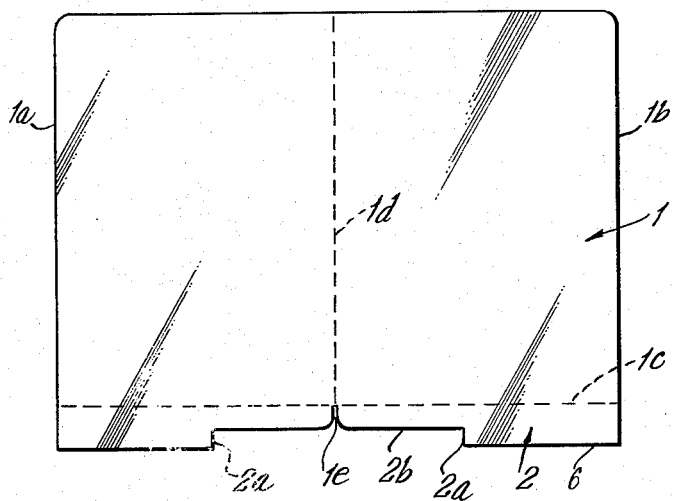

Aug. 15, 1961 W. LENNARTZ 2,996,239
RECEPTACLE MADE FROM PLASTIC MATERIAL WITH
REINFORCING LEDGE AND POCKET
Filed Feb. 19, 1959 2 Sheets-Sheet 1
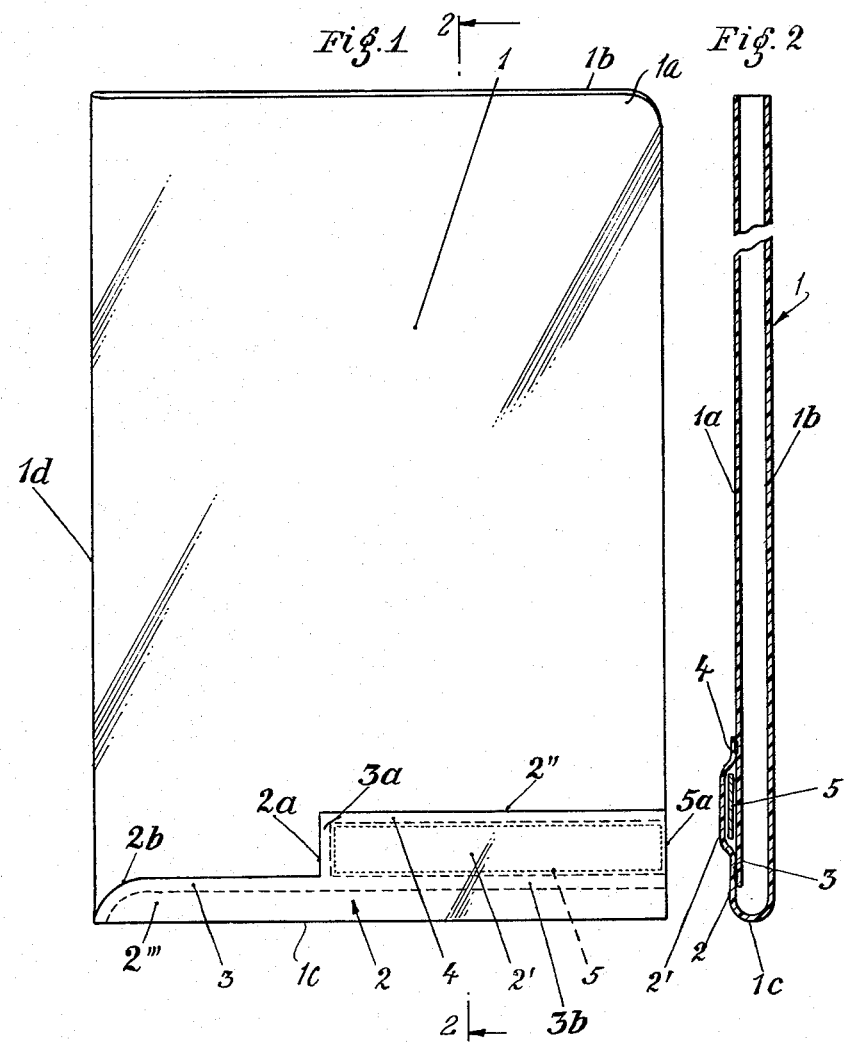
INVENTOR.
WALTER LENNARTZ
BY

INVENTOR.
WALTER LENNARTZ even with folder wall 1b is arc-shaped at location 2b as it continues the arched contour of the left hand end of extension 2 of folder wall 1a.

2,996,239

RECEPTACLE MADE FROM PLASTIC MATERIAL WITH REINFORCING LEDGE AND POCKET

Walter Lennartz, Krautergarten, Dachau-Ost, Germany
Filed Feb. 19, 1959, Ser. No. 794,339
Claims priority, application Austria Feb. 21, 1958
4 Claims. (Cl. 229—72)

The present invention relates to folders and similar receptacles for storing and retaining articles, in particular sheet-like papers, documents, etc. and further concerns a method of producing such folders or receptacles.

It is one of the objects of the present invention to provide means facilitating the production of folders and like receptacles of the aforesaid type through mass production methods, whereby single stamped blank of transparent or translucent and foldable plastic material is employed, which is capable of being subjected to heat sealing operation, and which permits that any waste of said material be kept at a minimum.

It is yet a further object of the present invention to provide means employing the extent of the heat sealed seam not only as a closure but also as a pocket for an indexing strip and if desired also as an abutment for papers or documents placed in such folder or receptacle.

Still another object of the present invention is to provide means rendering the possibility of completely using the inner space defined by the folder walls for receiving papers, documents and similar articles which are not obstructed or hindered in their position by a heat sealed edge forming part of a pocket for the insertion of an indexing strip.

It is still a further object of the invention to provide means redounding to a novel and very economical folder structure which is of pleasing appearance and which, when in blank formation is characterized by a specially designed and shaped (partly enlarged) ledge or wall extension, which may be folded over and bonded onto the front face or the rear face of one of the contiguous folder walls or onto the front face or the rear face of an opposite wall of the folder, whereby said walls define a space within which papers and like substantially flat articles of predetermined size or dimensions may be received, whereas the folded over extension after bonding operation constitutes with the respective folder wall a further space in the form of a pocket for receiving an indexing strip or an indicia carrier, said extension simultaneously presenting an overlap or gripping means facilitating manipulation and handling of said novel folder.

The above and other objects of the invention will become further apparent from the following detailed description, reference being made to the accompanying drawing, showing preferred embodiment of the invention.

Figure 4:
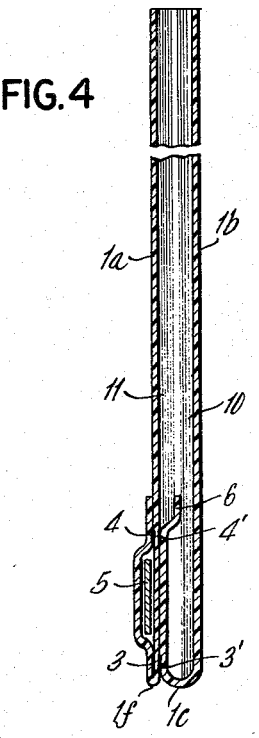
Figure 5:
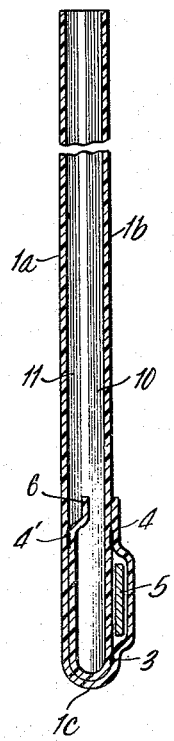

In the drawings:
FIG. 1 is a front elevational view of a folder embodying the invention;
FIG. 2 is a longitudinal cross sectional view of the folder of FIG. 1 and depicted on an enlarged scale.
FIGURE 3 is a top plan view of a blank for producing a folder or similar receptacle, modified with respect to the folder of FIGURE 1.
FIGURE 4 is a longitudinal cross sectional view of a folder similar to that of FIGURE 1 but modified, and produced from the blank of FIGURE 3 and shown on an enlarged scale.
FIGURE 5 is a longitudinal cross sectional view similar to folder of FIGURE 4 further modified and depicted on an enlarged scale.

Referring now more particularly to the drawings, there is shown in FIG. 1 a folder 1 having a front wall 1a and rear wall 1b and a crease or fold 1c.

Folder 1 may be made of a single piece of material with an extension or ledge 2 extending beyond the crease 1c when the folder is obtained from a single blank of pliable and transparent and/or translucent material. The folder walls 1a, 1b are then first placed upon each other in superposed position forming a connecting fold 1d, whereas the extension 2 is folded over in overlap position either on the outer surface of folder wall 1a or on the inner surface of folder wall 1b or on the outer surface of the latter.

In this particular instance the ledge or extension 2 is stepped at the location 2a which is disposed approximately at the center of the length of ledge 2 as shown.

Assuming that ledge 2 is folded over the outer surface of folder wall 1a, a suitably shaped electrode may then be applied to produce the heat sealed seam portions 3, 3a, 3b and 4 so that a pocket 2' is obtained having the opening 5a for the insertion of an indexing strip 5.

In this particular instance the indexing strip extends up to the seam portion 3a and the heat sealed seam 3b does not in any way obstruct the filling capacity of the folder, as the papers and like documents abut against the lower folding edge 1c of the turned-over extension 2.

It is further to be noted that extension 2 is somewhat arc-shaped at its end 2b, whereby the application of the extension strip 2 to the inner surface of folder wall 1b may be facilitated. In such case and proceeding in the same manner as hereinabove described with a single electrode heat sealing extension 2 to the inner surface of folder wall 1b a seam 4 may be disposed as an abutment for papers placed into the folder so that the latter may be readily employed for various papers of different dimensions depending upon the height of the step 2a chosen for this purpose. Otherwise, pocket 2' permits in the same manner as hereinabove described the insertion of an index carrier 5 through the end opening 5a of the pocket 2'.

It is well understood that the extension or ledge 2 may also be present at the longitudinal edge of the folder instead of along the transverse edge thereof.

If the extension 2 is applied as shown in FIG. 1 either to the front face of folder wall 1a or to the rear face of folder wall 1b in the manner as hereinabove explained, then such heat sealed connection functions also as a suitable gripping means for manipulating or handling the folder. In any of such cases, the filling capacity of the folder remains unaltered and is at a maximum at all times.

Only if the prolongation or extension 2 is applied to the inner face of wall 1b or wall 1a an abutment is created along seam 4 so that not only papers or documents of lesser height may be inserted in the folder for abutment against seam 4 but also other papers of greater height resting on fold edge 1c may be carried in the folder, as it is well understood.

It is well understood that seam 4 may also be carried out along the entire transverse extent of folder 1, whereby one or more pockets similar to that of 2' may be created if a necessity should present itself to employ a plurality of indexing strips.

FIG. 3 shows a blank 1 having the fold lines 1d and 1c. In this particular instance two transverse extensions 2 are employed in this blank 1, said extensions 2 being separated from each other by a slit 1e coinciding with the crease or fold line 1d. Thus, the folder or receptacle can be folded about crease 1d and the extension flaps 2 may be respectively folded at 1c as seen in FIGS. 4 and 5. These extensions are provided with heat sealed seams 4, 4' and 3, 3', extension 2 of folder wall 1a being turned over upon itself as seen forming the lower ledge 1f and a pocket for indexing strip 5.

The other extension 2 which is heat sealed or bonded at 4' provides a pocket between folder wall 1a and ledge end 6, say, for retaining letterhead size papers or documents 11, whereas legal size papers 10 reach into the longer folder opening defined by crease 1c.

According to FIG. 5 the extension 2 from folder wall 1a is folded over onto the outer surface of folder wall 1b and is heat sealed or bonded at locations 3 and 4, thereby forming a pocket for indexing strip 5, in a manner similarly shown in FIG. 2 of the aforesaid disclosure.

It can be seen from the aforesaid disclosure that the present invention has the further advantage that the overlapping extension 2 may readily predetermine the position and the extent of the pocket or space for receiving the indexing strip, the size or height of the papers to be stored in the folder, and that the heat sealing operation may be carried out by means of a single electrode producing in the enlarged portion 2" and/or reduced portion 2''' of the extension one or more pockets, as required.

It is to be observed that the overlapping and heat sealed extension 2 also contributes to the reinforcement of the folder and in particular in that part thereof which is generally grasped by the hand of the operator. The exteinsion further prevents bending or crushing of the folder to a great extent, as the walls thereof may be made of relatively thin pliable and foldable plastic material such as cellulose acetate, polyethylene or the like, either transparent or translucent, clear or tinted.

It can thus be seen that there has been provided in accordance with the present invention a receptacle in the form of a folder, bag or like article holding structure made of pliable plastic material and of the aforesaid type, which is characterized by a front wall, a rear wall, a crease connecting said front wall with said rear wall and integral therewith.

Thus, retainment of articles may be had within a first space defined between said walls, both said walls being bounded by terminal edges, at least one terminal edge of one of said walls being provided with an extension integral with said one wall and folded on a portion of the surface of a contiguous wall, and means bonding said extension to said wall portion in such a manner, so that a second space in the form of a pocket is attained, which is defined by said extension and said contiguous wall portion, said extension including a first part of reduced height terminating in an arc-shaped edge located at said crease and a second part of enlarged height and corresponding in length approximately to one half the extent of said one terminal edge, said pocket space being disposed at said second part of said extension and being located remote from said crease.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A substantially rectangular folder open on the top and on one side comprising front and back walls hingedly connected along their length at the bottom thereof, an extension flap formed at the side edge of one of said flat walls and including a free edge offset, said extension flap defining a relatively wide pocket-forming portion and a relatively long end closing portion, said extension flap being folded over the exterior face of the wall opposite the one to which it is secured, a first sealing seam extending entirely across said extension flap end closing portion and said pocket-forming portion, and a second sealing seam extending around the outer marginal edge of said pocket-forming portion to seal said portion to the underlying wall and to define with said underlying wall a pocket with an opening substantially flush with the top of said wall.

2. An open end open top receptacle according to claim 1, wherein said receptacle is formed of a heat sealable material and said securing seam is formed by heat sealing the flap to the adjacent wall of said receptacle.

3. An open ended open wall receptacle according to claim 1, including a removable inlay disposed in the pocket formed between said first extension flap and the adjacent receptacle wall.

4. An open end open top receptacle for holding paper files and the like comprising a pair of side walls having inner and outer faces and being hingedly connected together on a common line of juncture, an extension flap formed at an end of one of said side walls and folded over the outer face of the other of said side walls, a securing seam securing said flap to the side wall which it overlies, the seam extending around a line enclosing a pocket extending inwardly from the edge of the receptacle, said pocket being formed by said extension flap and the adjacent wall, and a second flap hingedly connected to the other of said walls and folded to overlie the interior face of the opposite wall, said second flap being secured to the interior face of the opposite wall at a spaced location from the end of said second flap whereby to form a separation flap separating the interior of said receptacle.

References Cited in the file of this patent
UNITED STATES PATENTS

| | | |
|---|---|---|
| 2,742,222 | Braccio | Apr. 17, 1956 |
| 2,777,574 | Brody | Jan. 15, 1957 |
| 2,860,826 | Cooke | Nov. 18, 1958 |
| 2,872,098 | Sauerman | Feb. 3, 1959 |

FOREIGN PATENTS

| | | |
|---|---|---|
| 288,742 | Switzerland | June 1, 1953 |
| 928,403 | Germany | May 31, 1955 |